(12) United States Patent
Song et al.

(10) Patent No.: US 9,421,758 B2
(45) Date of Patent: Aug. 23, 2016

(54) COMPOSITIONS AND USE OF COMPOSITIONS IN PRINTING PROCESSES

(71) Applicant: XEROX CORPORATION, Norwalk, CT (US)

(72) Inventors: Guiqin Song, Milton (CA); Marcel P. Breton, Mississauga (CA); Valerie M. Farrugia, Oakville (CA); James D. Mayo, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/502,202

(22) Filed: Sep. 30, 2014

(65) Prior Publication Data

US 2016/0089875 A1  Mar. 31, 2016

(51) Int. Cl.
*B41J 2/005* (2006.01)
*C08K 5/41* (2006.01)
(Continued)

(52) U.S. Cl.
CPC .............. *B41J 2/0057* (2013.01); *C08K 3/04* (2013.01); *C08K 5/41* (2013.01); *C09D 11/102* (2013.01); *C09D 11/106* (2013.01); *C09D 11/38* (2013.01)

(58) Field of Classification Search
CPC ... B41J 11/002; B41J 11/0015; B41J 2/2114; B41J 2/2117; B41J 2002/012; B41J 2/48; B41J 2002/16564; B41J 1/24; B41J 1/26; B41J 1/27; B41J 1/32; B41J 1/34; B41J 1/46; B41J 1/52; B41J 1/54; B41J 1/58; B41J 1/36; B41J 2/0057; B41M 5/0011; B41M 5/0017; C09D 11/00; C09D 11/106; C09D 11/107; C09D 11/38; B31F 1/07; B44B 5/0009; B44B 5/0014; B41C 1/10; B41C 1/184; B41F 17/002; B41L 47/00; B41L 47/02; B41L 47/24; B41L 45/08; B41L 47/04; B41L 47/42; B41K 1/08; B41K 1/14; B41K 1/16; B41K 3/00; B41K 3/02; B41K 3/04; B41K 3/102; B41K 3/105; B41K 3/107; B41K 3/32
See application file for complete search history.

(56) References Cited

U.S. PATENT DOCUMENTS 4,339,553 A   7/1982   Yoshimura et al.
4,970,098 A   11/1990  Ayala-Esquilin et al.
(Continued)

FOREIGN PATENT DOCUMENTS

EP   2228690 A1   9/2010
WO   2005047385 A1   5/2005

OTHER PUBLICATIONS

"Dimer Acids," Kirk-Othmer Encyclopedia of Chemical Technology, vol. 8, 4th Ed. (1992), pp. 223-237.
(Continued)

*Primary Examiner* — Geoffrey Mruk
*Assistant Examiner* — Scott A Richmond
(74) *Attorney, Agent, or Firm* — MH2 TECHNOLOGY LAW GROUP LLP

(57) ABSTRACT

An aqueous sacrificial coating composition for an image transfer member in an aqueous ink imaging system is provided. The sacrificial coating composition may include at least one polymer, at least one selected from (i) at least one chain extender, or (ii) a reactive elastomeric latex, wherein the at least one chain extender comprises a species capable of linking linear chains or chain segments of the reactive elastomeric latex, at least one hygroscopic plasticizer, and at least one surfactant.

6 Claims, 8 Drawing Sheets

(51) Int. Cl.
  *C09D 11/38*  (2014.01)
  *C08K 3/04*  (2006.01)
  *C09D 11/102*  (2014.01)
  *C09D 11/106*  (2014.01)

(56) References Cited

U.S. PATENT DOCUMENTS

| | | | |
|---|---|---|---|
| 4,997,642 A | 3/1991 | Curtis et al. | |
| 5,145,518 A | 9/1992 | Winnik et al. | |
| 5,146,087 A | 9/1992 | Vandusen | |
| 5,202,265 A | 4/1993 | LaMora | |
| 5,208,630 A | 5/1993 | Goodbrand et al. | |
| 5,225,900 A | 7/1993 | Wright | |
| 5,231,135 A | 7/1993 | Machell et al. | |
| 5,256,193 A | 10/1993 | Winnik et al. | |
| 5,271,764 A | 12/1993 | Winnik et al. | |
| 5,275,647 A | 1/1994 | Winnik | |
| 5,286,286 A | 2/1994 | Winnik et al. | |
| 5,301,044 A | 4/1994 | Wright | |
| 5,378,574 A | 1/1995 | Winnik et al. | |
| 5,385,803 A | 1/1995 | Duff et al. | |
| 5,464,703 A | 11/1995 | Ferrar et al. | |
| 5,474,852 A | 12/1995 | Fitzgerald et al. | |
| 5,494,702 A | 2/1996 | Blaine et al. | |
| 5,539,038 A | 7/1996 | Katsen et al. | |
| 5,543,177 A | 8/1996 | Morrison et al. | |
| 5,547,759 A | 8/1996 | Chen et al. | |
| 5,554,480 A | 9/1996 | Patel et al. | |
| 5,593,807 A | 1/1997 | Sacripante et al. | |
| 5,621,022 A | 4/1997 | Jaeger et al. | |
| 5,629,416 A | 5/1997 | Neigel et al. | |
| 5,695,878 A | 12/1997 | Badesha et al. | |
| 5,700,568 A | 12/1997 | Badesha et al. | |
| 5,736,520 A | 4/1998 | Bey et al. | |
| 5,744,200 A | 4/1998 | Badesha et al. | |
| 5,750,204 A | 5/1998 | Badesha et al. | |
| 5,753,307 A | 5/1998 | Badesha et al. | |
| 5,841,456 A | 11/1998 | Takei et al. | |
| 5,945,245 A | 8/1999 | Mychajlowskij et al. | |
| 6,020,300 A | 2/2000 | Tcheou et al. | |
| 6,042,227 A * | 3/2000 | Meinhardt | B41M 5/52 106/31.29 |
| 6,051,562 A | 4/2000 | Chamberlain et al. | |
| 6,103,815 A | 8/2000 | Mammino et al. | |
| 6,156,858 A | 12/2000 | Keoshkerian et al. | |
| 6,221,137 B1 | 4/2001 | King et al. | |
| 6,348,509 B1 | 2/2002 | Reeve | |
| 6,586,100 B1 | 7/2003 | Pickering et al. | |
| 7,172,276 B2 | 2/2007 | Breton et al. | |
| 7,202,883 B2 | 4/2007 | Breton et al. | |
| 7,281,790 B2 | 10/2007 | Mouri et al. | |
| 7,294,377 B2 | 11/2007 | Gervasi et al. | |
| 7,374,812 B2 | 5/2008 | Mizuno | |
| 7,608,325 B2 | 10/2009 | Rasch et al. | |
| 7,767,011 B2 | 8/2010 | Bedford et al. | |
| 7,780,286 B2 | 8/2010 | Yahiro | |
| 8,038,284 B2 | 10/2011 | Hori et al. | |
| 8,136,936 B2 | 3/2012 | Hook et al. | |
| 8,142,557 B2 | 3/2012 | Belelie et al. | |
| 8,215,762 B2 | 7/2012 | Ageishi | |
| 8,247,066 B2 | 8/2012 | Wu | |
| 8,268,399 B2 | 9/2012 | Gervasi et al. | |
| 8,350,879 B2 | 1/2013 | Larson et al. | |
| 8,500,269 B2 | 8/2013 | Morita | |
| 8,919,252 B2 | 12/2014 | Lestrange et al. | |
| 9,011,594 B1 | 4/2015 | Kanungo et al. | |
| 9,022,546 B1 | 5/2015 | Breton et al. | |
| 9,126,430 B2 | 9/2015 | Liu | |
| 9,138,985 B1 | 9/2015 | Yang et al. | |
| 9,174,432 B2 | 11/2015 | Liu et al. | |
| 9,187,587 B2 | 11/2015 | Kanungo et al. | |
| 9,193,209 B2 | 11/2015 | Dooley et al. | |
| 9,211,697 B2 | 12/2015 | Dooley et al. | |
| 9,227,393 B2 | 1/2016 | Song et al. | |
| 2002/0064648 A1 | 5/2002 | Schlueter et al. | |
| 2003/0067528 A1 | 4/2003 | Chowdry et al. | |
| 2003/0233952 A1 | 12/2003 | Pan et al. | |
| 2003/0233953 A1 | 12/2003 | Pan et al. | |
| 2003/0234840 A1 | 12/2003 | Pan et al. | |
| 2004/0158056 A1 | 8/2004 | Hiemstra et al. | |
| 2004/0253436 A1 | 12/2004 | Heeks et al. | |
| 2005/0018027 A1 | 1/2005 | Pan et al. | |
| 2006/0105117 A1 | 5/2006 | Kim et al. | |
| 2007/0207186 A1 | 9/2007 | Scanlon et al. | |
| 2007/0207269 A1 | 9/2007 | Woodhall et al. | |
| 2008/0032072 A1 | 2/2008 | Taniuchi et al. | |
| 2008/0055381 A1 | 3/2008 | Doi et al. | |
| 2009/0110942 A1 | 4/2009 | Henderson-Rutgers et al. | |
| 2009/0237479 A1 | 9/2009 | Yamashita et al. | |
| 2011/0018925 A1 | 1/2011 | Ohara | |
| 2011/0025752 A1 | 2/2011 | Law et al. | |
| 2011/0122195 A1 | 5/2011 | Kovacs et al. | |
| 2011/0122210 A1 | 5/2011 | Sambhy et al. | |
| 2011/0269849 A1 | 11/2011 | Yao et al. | |
| 2012/0039648 A1 | 2/2012 | Sambhy et al. | |
| 2012/0042518 A1 | 2/2012 | Law et al. | |
| 2012/0083530 A1 | 4/2012 | Mai et al. | |
| 2012/0103212 A1 | 5/2012 | Stowe et al. | |
| 2012/0140009 A1 | 6/2012 | Kanasugi et al. | |
| 2012/0162312 A1 | 6/2012 | Ahl et al. | |
| 2012/0251685 A1 | 10/2012 | Wang-Nolan et al. | |
| 2012/0274914 A1 | 11/2012 | Stowe et al. | |
| 2012/0283098 A1 | 11/2012 | Zhang et al. | |
| 2012/0301818 A1 | 11/2012 | Gilmartin et al. | |
| 2013/0266803 A1 | 10/2013 | Dooley et al. | |
| 2013/0272763 A1 | 10/2013 | Moorlag et al. | |
| 2014/0060352 A1 | 3/2014 | Gervasi et al. | |
| 2014/0060357 A1 | 3/2014 | Hsieh | |
| 2014/0060359 A1 | 3/2014 | Kanungo et al. | |
| 2014/0060360 A1 | 3/2014 | Moorlag et al. | |
| 2014/0060361 A1 | 3/2014 | Gervasi et al. | |
| 2014/0060363 A1 | 3/2014 | Kelly et al. | |
| 2014/0060365 A1 | 3/2014 | Gervasi et al. | |
| 2014/0154377 A1 | 6/2014 | Wang-Nolan et al. | |
| 2014/0168330 A1 | 6/2014 | Liu et al. | |
| 2015/0004861 A1 | 1/2015 | Gervasi et al. | |
| 2015/0022602 A1 | 1/2015 | Landa et al. | |
| 2015/0085036 A1 | 3/2015 | Liu | |
| 2015/0085039 A1 | 3/2015 | Liu | |
| 2015/0116414 A1 | 4/2015 | Eliyahu et al. | |
| 2015/0119510 A1 | 4/2015 | Eliyahu et al. | |
| 2015/0165758 A1 | 6/2015 | Sambhy et al. | |
| 2015/0258778 A1 | 9/2015 | Dooley et al. | |
| 2015/0267078 A1 | 9/2015 | Dooley | |
| 2015/0275022 A1 | 10/2015 | Chen et al. | |
| 2015/0291847 A1 | 10/2015 | Condello et al. | |
| 2015/0315403 A1 | 11/2015 | Song et al. | |
| 2015/0315409 A1 | 11/2015 | Song et al. | |
| 2015/0343797 A1 | 12/2015 | Song et al. | |
| 2016/0083606 A1 | 3/2016 | Sisler et al. | |
| 2016/0083607 A1 | 3/2016 | Sisler et al. | |
| 2016/0083609 A1 | 3/2016 | Sisler et al. | |
| 2016/0083636 A1 | 3/2016 | Yoshida et al. | |

OTHER PUBLICATIONS

Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.

Bruce E. Kahn, "The M3D Aerosol Jet System, An Alternative to Inkjet Printing for Printed Electronics", Organic and Printed Electronics, vol. 1, Issue 1, Winter 2007, pp. 14-17.

Jikei et al. "Synthesis and Properties of Hyperbranched Aromatic Polyamide Copolymers from AB and AB2 Monomers by Direct Polycondensation", Macromolecules 2000, 33, pp. 6228-6234 (2000).

Sisler, Gorden et al., Sacrificial Coating for Intermediate Transer of an Indirect Printing Apparatus, U.S. Appl. No. 14/493,398, filed Sep. 23, 2014.

Kanungo, et al., "Multilayer Imaging Blanket Coating", U.S. Appl. No. 14/576,734, filed Dec. 19, 2014.

(56) References Cited

OTHER PUBLICATIONS

Song, et al., "Sacrificial Coating and Indirect Printing Apparatus Employing Sacrificial Coating on Intermediate Transfer Member", U.S. Appl. No. 14/665,319, filed Mar. 23, 2015.
Larson, et al., "Sacrificial Coating and Indirect Printing Apparatus Employing Sacrificial Coating on Intermediate Transfer Member", U.S. Appl. No. 14/830,557, filed Aug. 19, 2015.
Larson, et al., "Sacrificial Coating and Indirect Printing Apparatus Employing Sacrificial Coating on Intermediate Transfer Member", U.S. Appl. No. 14/867,864, filed Sep. 28, 2015.
http://www2.dupont.com/Elvanol/en_US/assets/downloads/elvanol_51_05.pdf, 2006.
Dow, Dow Surfacants, http://www.dow.com/surfacants/products/second.htm, retrieved Mar. 10, 2014, pp. 1-2.
Dow, Material Safety Data Sheet, TERGITOL(TM) TMN-6 (90% AQ), The Dow Chemical Company, Feb. 12, 2003, pp. 1-15.
Author Unknown, Byk-Silclean 3700 by BYK Chemie, http://www.specialchem4coatings.com/tds/byk-silclean-3700/byk-chemie/10414/index.aspx?q=Byk%20Silclean%203700, 2013, 1 page.
Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FDO&pg_num=EB7C5520-9065-98A0-5A4CD71113D57191&pf=0&pf=1, 2007, 1 page.
Law et al., "Self Cleaning Polymers and Surfaces", TechConnect World Conference & Expo, Jun. 13-16, 2011, abstract of presentation, 1 page.
Author Unknown, "Products and Properties: Desmodur/Desmophen for Coatings, Commerical Products", Bayer MaterialScience AG brochure, Edition: Jul. 2005 E, 28 pages.
Dow, Product Safety Assessment, TRITON CF Series Surfactants, Dec. 16, 2012, 6 pages.
Wikipedia, Hydrocarbon, Downloaded Mar. 2, 2016, 8 pages.
Reddy et al., "Citric acid cross-linking of starch films," University of Nebraska—Lincoln, Faculty Publications—Textiles, Merchandising and Fashion Design, Paper 25, 2009, pp. 702-711.
Wikipedia, "Tricarboxylic Acid," 2 pages printed on Aug. 19, 2015.
Wikipedia, "Dicarboxylic Acid," 7 pages printed on Aug. 19, 2015.
Wikipedia, "Tetracarboxylic acids", 2 pages printed on Aug. 19, 2015, https://commons.wikimedia.org/wiki/Category:Tetracarboxylic_acids.
Berset 2185, Technical Data Sheet, Mar. 14, 2012, 2 pages.
Wang, et al., "Preparation of a Crosslinking Cassava Starch Adhesive and its Application in Coating Paper", BioResources, 2013, 8 (3), pp. 3574-3589.
Philipp, et al., "Three Methods for In Situ Cross-Linking of Polyvinyl Alcohol Films for Application as Ion-Conducting Membranes in Potassium Hydroxide Electrolyte", NASA, Apr. 1979, 18 pages.
Song, "Starch crosslinking for cellulose fiber modification and starch nanoparticle formation", https://smarttech.gatech.edu/handle/1853/39524?show=full, downloaded Jan. 22, 2015, 4 pages.
Cabot, "Specialty Carbon Blacks for Ultraviolet Protection & Weatherability", Cabot Corporation, 2 pages.

\* cited by examiner

COMPOSITIONS AND USE OF COMPOSITIONS IN PRINTING PROCESSES

DETAILED DESCRIPTION

Field of the Disclosure

This disclosure relates generally to indirect inkjet printers, and in particular, to a sacrificial coating employed on an intermediate transfer member of an inkjet printer and a method of depositing a sacrificial coating.

BACKGROUND

In aqueous ink indirect printing, an aqueous ink is jetted onto an intermediate imaging surface, which can be in the form of a blanket. The ink is partially dried on the blanket prior to transfixing the image to a media substrate, such as a sheet of paper. To ensure excellent print quality it is desirable that the ink drops jetted onto the blanket spread and become well-coalesced prior to drying. Otherwise, the ink images appear grainy and have deletions. Lack of spreading can also cause missing or failed inkjets in the printheads to produce streaks in the ink image. Spreading of aqueous ink is facilitated by materials having a high energy surface.

In order to facilitate transfer of the ink image from the blanket to the media substrate after the ink is dried on the intermediate imaging surface, a blanket having a surface with a relatively low surface energy is preferred. Rather than providing the desired spreading of ink, low surface energy materials tend to promote "beading" of individual ink drops on the image receiving surface.

An optimum blanket for an indirect image transfer process must tackle both the challenges of wet image quality, including desired spreading and coalescing of the wet ink; and the image transfer of the dried ink. The first challenge—wet image quality—prefers a high surface energy blanket that causes the aqueous ink to spread and wet the surface. The second challenge—image transfer—prefers a low surface energy blanket so that the ink, once partially dried, has minimal attraction to the blanket surface and can be transferred to the media substrate.

Various approaches have been investigated to provide a solution that balances the above challenges. These approaches include blanket material selection, ink design and auxiliary fluid methods. With respect to material selection, materials that are known to provide optimum release properties include the classes of silicone, fluorosilicone, a fluoropolymer such as TEFLON or VITON, and certain hybrid materials. These materials have low surface energy, but provide poor wetting. Alternatively, polyurethane and polyimide have been used to improve wetting, but at the cost of ink release properties.

Tuning ink compositions to address these challenges has proven to be difficult since the primary performance attribute of the ink is the performance in the print head. For instance, if the ink surface tension is too high it will not jet properly and it if is too low it will drool out of the face plate of the print head. Additional attempts at solving the above challenges have included applying a sacrificial wetting enhancement starch coating onto the blanket to improve wetting and spread of ink while maintaining transfer capabilities.

Identifying and developing new polymers that improve wet image quality and/or image transfer and methods of depositing such polymers would be considered a welcome advance in the art.

SUMMARY

In an embodiment there is an aqueous sacrificial coating composition for an image transfer member in an aqueous ink imaging system. The sacrificial coating composition may include at least one polymer, at least one selected from (i) at least one chain extender, or (ii) a reactive elastomeric latex, wherein the at least one chain extender comprises a species capable of linking linear chains or chain segments of the reactive elastomeric latex, at least one hygroscopic plasticizer, and at least one surfactant.

In another embodiment there is an ink composition. The ink composition can include a latex emulsion, a reactive elastomeric latex capable of reacting with a chain extender, at least one colorant, and at least one solvent.

In yet another embodiment there is an indirect printing process. The process can include forming a liquid sacrificial coating composition layer by applying one or more components of a sacrificial coating composition onto an intermediate transfer member of a printing apparatus. The printing process can include forming a sacrificial coating by at least partially drying the liquid sacrificial coating composition, optionally, forming a partially cured sacrificial coating by activating a chain extender of the liquid sacrificial coating composition to at least partially cure the sacrificial coating, ejecting droplets of an ink composition in an imagewise pattern onto the partially dried sacrificial coating or partially cured sacrificial coating, processing the ink to form an ink pattern on the intermediate transfer member, wherein processing comprises activating the chain extender to react with the reactive elastomeric latex and substantially drying the ink composition, and transferring both the ink pattern and the sacrificial coating from the intermediate transfer member to a final substrate. The one or more components of the sacrificial coating composition may be selected from the group consisting of at least one polymer, at least one chain extender, wherein the at least one chain extender comprises a species capable of linking linear chains or chain segments of the reactive elastomeric latex, at least one hygroscopic plasticizer; and at least one surfactant. The ink composition may include a latex emulsion and a reactive elastomeric latex capable of reacting with the chain extender.

Embodiments of the present disclosure can provide one or more of the following advantages: coatings having good wettability, coatings having good ink wetting and ink spreading, image transfer member coatings exhibiting improved wet image quality and/or improved image transfer with aqueous inks, improved physical robustness or increased shelf life.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
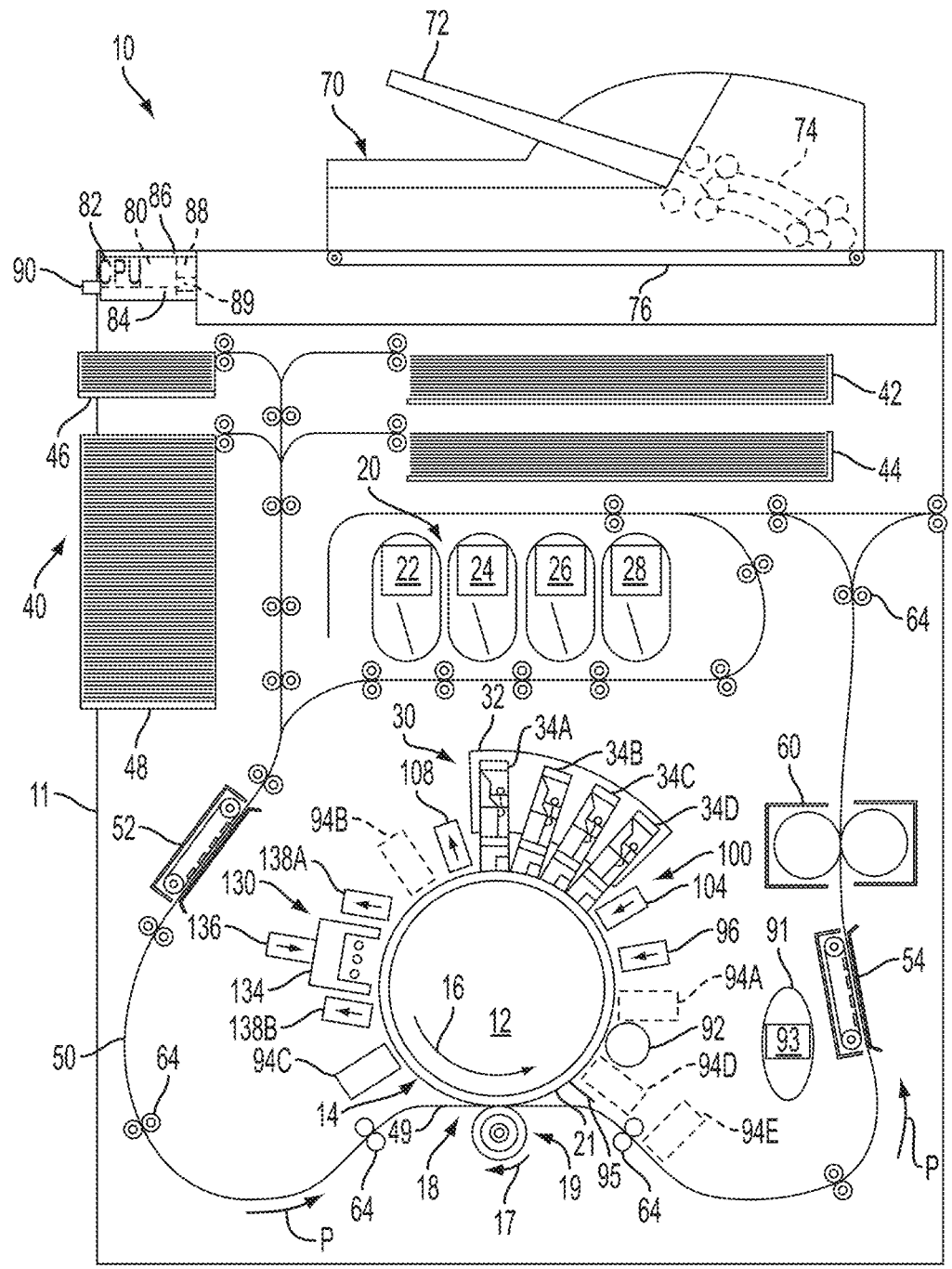
FIG. 1 is a schematic drawing of an aqueous indirect inkjet printer that prints sheet media, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant. Various components can be included in an aqueous ink composition as described further below.

As used herein, the term "hydrophilic" refers to any composition or compound that attracts water molecules or other solvents used in aqueous ink. As used herein, a reference to a hydrophilic composition refers to a liquid carrier that carries a hydrophilic agent. Examples of liquid carriers include, but are not limited to, a liquid, such as water or alcohol, that carries a dispersion, suspension, or solution.

As used herein, the term "crosslinker" refers to low-molecular multifunctional species that can modify physical properties of compositions of monomers, prepolymers or macromolecules. For example, as is understood in the art, "crosslinker" may refer to difunctional (f=2) species (also known as "chain extenders") that link linear chains or chain segments to obtain higher molecular weight linear macromolecules, as well as tri-functional (f=3) or multifunctional (f>3) species that link linear chains or chain segments to obtain tridimensional macromolecules of higher crosslinking density.

As used herein, a reference to a dried layer or dried coating refers to an arrangement of a liquid composition after all or a substantial portion of the liquid carrier has been removed from the composition through a drying process and/or the arrangement of a cured liquid composition. As described in more detail below, an indirect inkjet printer forms a layer of a sacrificial coating composition on a surface of an intermediate transfer member using a liquid carrier, such as water, to apply a layer of the sacrificial coating composition. The liquid carrier is used as a mechanism to convey the sacrificial coating composition to an image receiving surface to form a uniform layer, such as a sacrificial coating, on the image receiving surface.

An embodiment of the present disclosure is directed to an aqueous sacrificial coating composition for an image transfer member in an aqueous ink imaging system. Through appropriate selection of components for each of an ink composition and/or sacrificial coating composition, controlled transfer of image from the intermediate substrate to the final substrate may be achieved. In an embodiment, a reactive elastomeric latex is included in an ink composition, for example, as a blend with a conventional latex. A cross linker or chain extender in the sacrificial coating composition that may be activated to partially cure the film during a drying process may be selected, for example, to partially cure the composition enough for the image to achieve appropriate transfer rheology. In an example, the crosslinker or chain extender can be digitally added to the partially dried sacrificial, for example as droplets ejected from an inkjet printhead.

The sacrificial coating composition may include at least one polymer, at least one selected from (i) at least one cross linker, such as a chain extender, or (ii) a reactive elastomeric latex, wherein the at least one chain extender comprises a species capable of linking linear chains or chain segments of the reactive elastomeric latex, at least one hygroscopic plasticizer, and at least one surfactant.

The at least one polymer may be at least one hydrophilic polymer. The at least one hydrophilic polymer may be selected from the group consisting of starch, polyvinyl alcohol (PVOH), copolymers of PVOH, poly(vinylpyrrolidinone) (PVP), poly(ethylene oxide), hydroxyethyl cellulose, cellulose acetate, poly(ethylene glycol), poly(ethylene glycol), copolymers of poly(ethylene glycol), diblock copolymers of poly(ethylene glycol), triblock copolymers of poly(ethylene glycol), polyacrylamide (PAM), poly(N-isopropylacrylamide) (PNIPAM), poly(acrylic acid), polymethacrylate, acrylic polymers, maleic anhydride copolymers, sulfonated polyesters, and mixtures thereof. The at least one hydrophilic polymer can have suitable weight average molecular weight from 3000 to 300,000. In an embodiment, the at least one hydrophilic polymer can provide a suitable viscosity for forming a sacrificial coating on an intermediate transfer member. For example, at about 5% by weight of the at least one hydrophilic polymer in a solution DI water, at 20° C. the viscosity can range from about 2 cps to about 800 cps, such as about 3 cps to about 500 cps, or about cps to about 100 cps, where the % by weight is relative to the total weight of the at least one hydrophilic polymer and water. The at least one hydrophilic polymer may have excellent wet film-forming and good water retention properties which can assist the ink spreading on the blanket, and can have uniform film-forming properties, for example, after the liquid coating composition is semi-dried or dried on a substrate. The at least one hydrophilic polymer may have 100% solubility in water or hydrophilic media.

In an embodiment, the at least one polymer may include one or more repeating polymeric units selected from the group consisting of alkyl acrylate, styrene and butadiene, isoprene, methacrylonitrile, acrylonitrile, vinyl ethers, vinyl esters, vinyl ketones, vinylidene halide, N-vinyl indole, N-vinyl pyrrolidene, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, and mixtures thereof.

The at least one crosslinker may include at least one of a difunctional (such as a chain extender), trifunctional or multifunctional compound. Thus, the at least one crosslinker or chain extender may include a hydroxyl terminated compound, an amine terminated compound, or mixtures thereof. For example, hydroxyl compounds usable as crosslinkers or chain extenders may be difunctional ones selected from ethylene glycol, diethylene glycol, triethylene glycol, tetraethylene glycol, propylene glycol, dipropylene glycol, tripopylene glycol, 1,3-propanediol, 1,3-butanediol, 1,4-butanediol, neopentyl glycol, 1,6-heanediol, 1,4-cyclohexanedimethanol, hydroquinone Bis(2-hydroxyethyl) ether (HQEE), ethanolamine, diethanolamine, methyldiethanolamine, and phenyldiethanolamine. Hydroxyl compounds usable as crosslinkers may also be trifunctional ones selected from glycerol, trimethylolpropane, 1,2,6-hexanetriol, and triethanolamine. Hydroxyl compounds usable as crosslinkers may be tetrafunctional ones selected from pentaerythritol, and N,N,N',N'-tetrakis(2-hdroxypropyl)ethylenediamine. Amine compounds usable as crosslinkers may be difunctional ones selected from diethyltoluenediamine, and dimethylthiotoluenediamine. Additionally, the crosslinker may be selected from 1,4,-Bis(2-hydroxyethoxy)benzene (BHEB). In an embodiment, a weight percentage of the crosslinker may be between about 0 wt and about 10 wt %, for example 0.1 wt % to about 10 wt %, such as greater than 0 wt % and less than about 4 wt %.

The reactive elastomeric latex may be a polyurethane elastomer, for example, a water-based aliphatic polyurethane elastomer such as PRECIDIUM™ Aqua 90A (available from Quantum Chemical, Alberta, Canada). Accordingly, the crosslinker may be any material that can crosslink with the polyurethane elastomer.

The polymer-containing sacrificial coating of the embodiments can be tailored to fine-tune the wettability and release characteristics of the sacrificial coating from the underlying ITM surface. This can be accomplished, in part, by employing one or more hygroscopic materials and one or more surfactants in the sacrificial coating composition. Any suitable hygroscopic material can be employed. For example, the hygroscopic material can be functionalized as a plasticizer. Accordingly, as used herein, the term "hygroscopic plasticizer" refers to a hygroscopic material that has been functionalized and can be characterized as a plasticizer. In an embodiment, the at least one hygroscopic material is selected from the group consisting of glycerol/glycerin, sorbitol, xylitol, maltito, polymeric polyols such as polydextrose, glyceryl triacetate, vinyl alcohol, glycols such as propylene glycol, hexylene glycol, butylene glycol, urea, alpha-hydroxy acids (AHA's). A single hygroscopic material can be used. Alternatively, multiple hygroscopic materials, such as two, three or more hygroscopic materials, can be used.

Any suitable surfactants can be employed. Examples of suitable surfactants include anionic surfactants, cationic surfactants, non-ionic surfactants such as TERGITOL™ TMN-6 (available from The Dow Chemical Company, Midland, Mich.) and mixtures thereof. The non-ionic surfactants can have an HLB value ranging from about 4 to about 14. A single surfactant can be used. Alternatively, multiple surfactants, such as two, three or more surfactants, can be used. For example, a mixture of a non-ionic surfactant with a low HLB value from about 4 to about 8, and a high HLB non-ionic surfactant with value from about 10 to about 14 demonstrates good wetting performance.

Initially, the sacrificial coating composition is applied to the intermediate transfer member ("ITM"), where it is semi-dried or dried to form a film, such as a sacrificial coating. The sacrificial coating can have a higher surface energy and/or be more hydrophilic than the base ITM, which is usually a material with low surface free energy, such as, for example, a polysiloxane, such as polydimethylsiloxane or other silicone rubber material, fluorosilicone, TEFLON, polyimide or combinations thereof.

In an embodiment, the sacrificial coating composition is made by mixing the ingredients comprising: at least one polymer, at least one hygroscopic plasticizer; at least one surfactant and water. The sacrificial coating composition can further be made by mixing, in addition to the above ingredients, at least one selected from (i) at least one crosslinker, such as a chain extender, or (ii) the reactive elastomeric latex. These ingredients can be mixed in any suitable manner to form a sacrificial coating composition that can be coated onto the intermediate transfer member. The sacrificial coating composition may have a pH of from about 5 pH to about 10 pH. In addition to the ingredients discussed above, the mixture can include other ingredients, such as solvents and biocides. Example biocides include ACTICIDES® CT, ACTICIDES® LA 1209 and ACTICIDES® MBS in any suitable concentration, such as from about 0.1 weight percent to about 2 weight percent. Examples of suitable solvents include water, isopropanol, MEK (methyl ethyl ketone) and mixtures thereof.

The ingredients of the sacrificial coating composition may be mixed in any suitable amounts. For example, the at least one hydrophilic polymer may be added in an amount of from about 0.5 wt % to about 30 wt %, or from about 1 wt % to about 10 wt %, or from about 1.5 wt % to about 5 wt % based upon the total weight of the sacrificial coating composition. The at least one surfactant may be present in an amount of from about 0.1 wt % to about 4 wt %, or from about 0.3 wt % to about 2 wt %, or from about 0.5 wt % to about 1 wt %, based upon the total weight of the sacrificial coating composition. The at least one hygroscopic plasticizer may be present in an amount of from about 0.5 wt % to about 30 wt %, or from about 5 wt % to about 20 wt %, or from about 10 wt % to about 15 wt %, based upon the total weight of the sacrificial coating composition. The at least one reactive elastomeric latex may be present in an amount of from greater than 0 wt % to about 10 wt %, for example less than or equal to about 3 wt %, based upon the total weight of the sacrificial coating composition. The crosslinker, for example, the chain extender, may be present in an amount of from greater than 0 wt % to about 10 wt %, for example, from about 0.1 wt % to about 10 wt %, such as, greater than 0%, based upon the total weight of the sacrificial coating composition.

The sacrificial coating composition can be applied over the substrate by any suitable method including, but not limited to, dip coating, spray coating, spin coating, flow coating, stamp printing, die extrusion coatings, flexo and gravure coating and/or blade techniques In exemplary embodiments, an air atomization device such as an air brush or an automated air/liquid spray can be used for spray coating. In another example, a programmable dispenser can be used to apply the coating material to conduct a flow coating.

In embodiments, the sacrificial coating composition can first be applied or disposed as a wet coating on the intermediate transfer member. A drying or curing process can then be employed. In embodiments, the wet coating can be heated at an appropriate temperature for the drying and curing, depending on the material or process used. For example, the wet sacrificial coating composition can be heated to a temperature ranging from about 30° C. to about 200° C. for about 0.01 to about 100 seconds or from about 0.1 second to about 60 seconds. In embodiments, after the drying and curing process, the sacrificial coating can have a thickness ranging from about 0.02 micrometer to about 10 micrometers, or from about 0.02 micrometer to about 5 micrometers, or from about 0.05 micrometer to about 1 micrometers. Depending on the temperature and time selected for heating the deposited sacrificial coating composition, a sacrificial coating may form via partial drying and the crosslinker, for example, the chain extender, may be activated to partially cure the sacrificial coating.

In an embodiment, the sacrificial coating can cover a portion of a major surface of the intermediate transfer member. The major outer surface of the intermediate transfer member can comprise, for example, polysiloxane and/or a fluorinated polymer.

It has been found that the sacrificial coating overcomes the wet image quality problem discussed above by providing an ink wetting surface on the intermediate transfer member. The coatings may also improve the image cohesion significantly to enable excellent image transfer.

An embodiment of the present disclosure also includes the deposition of an ink composition, for example, an aqueous latex ink composition, onto the sacrificial coating. The ink composition can be a reactive ink composition, for example, an ink composition that includes a component that reacts with a component of the underlying sacrificial coating. In an embodiment, the ink composition can include a latex emulsion and a reactive elastomeric latex capable of reacting, for example, reacting with a component of the underlying sacrificial coating, such as a crosslinker, which may be a chain extender, which may be included as a component of the sacrificial coating composition or deposited in/on a sacrificial coating, such as a partially dried sacrificial coating. The ink composition may also include a colorant and a solvent.

The ink of the present embodiments may include a latex emulsion comprising polymer particles. For example, the latex emulsion may comprise a polystyrene copolymer latex. That is, the latex emulsion comprises polymer particles comprising polystyrene copolymer formed by emulsion polymerization, for example, of styrene, n-butyl acrylate, methacrylic acid, beta-carboxyethylacrylate (beta-CEA) and a surfactant. In other words, the polystyrene copolymer latex comprises (or can be derived from) styrene monomer and one or more co-monomers such as alkyl acrylate, alkyl methacrylate, alkyl acrylate-acrylic acid, 1,3-diene-acrylic acid, alkyl methacrylateacrylic acid, alkyl methacrylate-alkyl acrylate, alkyl methacrylate-aryl acrylate, aryl methacrylate-alkyl acrylate, alkyl methacrylateacrylic acid. In certain embodiments, the co-monomer is selected from among acrylates, methacrylates and mixtures thereof. In certain embodiments, the copolymer is comprised of styrene monomer and an alkyl acrylate. In one embodiment, the copolymer is comprised of styrene monomer and butyl acrylate, e.g., n-butyl acrylate, monomer. In further embodiments, the copolymer further includes an amount of 13-carboxyethyl acrylate (13-CEA). In certain embodiments, the polystyrene copolymer latex includes an acrylic emulsion latex, obtained from alkyl acrylates having alkyl groups of from 1 to 18 carbon atoms, from 1 to 6 carbon atoms, or from 1 to 4 carbon atoms. The latex of the latex emulsion may have a low glass transition temperature (Tg), for example, having a Tg less than 63° C., for example, having a Tg of about 53° C. or less.

The reactive elastomeric latex may include a polyurethane elastomer, for example, the water-based aliphatic polyurethane elastomer described for use in the sacrificial coating composition. The reactive elastomeric latex may be provided in an amount, for example, from greater than 0 wt % to about 10 wt %, such as from about 0.01 wt % to about 10 wt %, such as greater than 0 wt % and less than about 5 wt % of the ink composition.

The ink composition may have a viscosity of about 3 cps to about 12 cps at a temperature suitable for ejecting as droplets from an inkjet printhead.

Suitable colorants for use in the ink according to the present disclosure include, without limitation, carbon black, lamp black, iron black, ultramarine, Aniline Black, Aniline Blue, azo oil black, Basic 6G Lake, Benzidine Yellow, Benzimidazolone Brown HFR, Benzimidazolone Carmine HF3C, Brilliant Green lakes, carbon black, Chrome Yellow, Dioxazine Violet, disazo pigments, Disazo Yellow AAA, Du Pont Oil Red, Fast Yellow G, Hansa Brilliant Yellow 5GX, Hansa Yellow, Hansa Yellow G, Lake Red C, Malachite Green hexylate, Malachite Green, metallic salts of salicylic acid and salicylic acid derivatives, Methyl Violet Lake, Methylene Blue Chloride Methylene Blue, monoazo pigments, Naphthol Red HFG, Naphtol Yellow, Nigrosine dye, oil black, Phthalocyanine Blue, Phthalocyanine Green, quinacridone, Quinoline Yellow; Rhodamine 6G Lake, Rhodamine B; Rose Bengale, Tartrazine Lake, tertiary ammonium salts, titanium oxide, trisazo pigments, Ultramarine Blue, Victoria Blue, Watching Red, mixtures thereof, and the like.

An indirect printing process that utilizes the sacrificial coating composition and ink compositions above is performed by way of an ink image producing machine, such as a printer. FIG. 1 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 because the surface 14 receives a hydrophilic composition and the aqueous ink images that are transfixed to print media during a printing process.

A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media, including an indirect printing process of the embodiments.

The printer 10 includes a frame 11 that supports directly or indirectly operating subsystems and components, which are described below. The printer 10 includes an intermediate transfer member, which is illustrated as rotating imaging drum 12 in FIG. 1, but can also be configured as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a print medium 49. In some embodiments, a heater in the drum 12 (not shown) or in another location of the printer heats the image receiving surface 14 on the blanket 21 to a temperature in a range of, for example, approximately 50° C. to approximately 70° C. The elevated temperature promotes partial drying of the liquid carrier that is used to deposit the sacrificial coating composition and of the water in the aqueous ink drops that are deposited on the image receiving surface 14.

The blanket is formed of a material, such as that described above, having a relatively low surface energy to facilitate transfer of the ink image from the surface of the blanket 21 to the print medium 49 in the nip 18. Such materials include polysiloxanes, fluoro-silicones, fluoropolymers such as VITON or TEFLON and the like. A surface maintenance unit (SMU) 92, described below, removes residual ink left on the surface of the blanket 21 after the ink images are transferred to the print medium 49. The low energy surface of the blanket does not aid in the formation of good quality ink images because such surfaces do not spread ink drops as well as high energy surfaces.

Figure 2A:
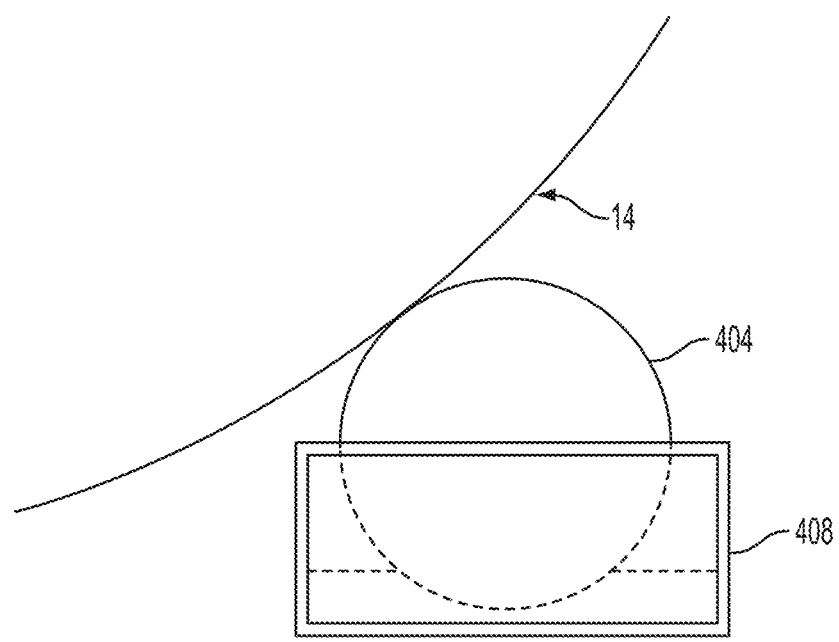
FIG. 2A is a schematic drawing of a surface maintenance unit that applies a sacrificial coating composition onto a surface of an intermediate transfer member in an inkjet printer, according to an embodiment of the present disclosure.

In an embodiment depicted in FIG. 2A, the SMU 92 includes a coating applicator, such as a donor roller 404, which is partially submerged in a reservoir 408 that holds one or more components of the sacrificial coating composition described above. For example, reservoir 408 may hold some or all of the following: the at least one polymer, the at least one of (i) the at least one crosslinker, for example, a chain extender, or (ii) the reactive elastomeric latex, the at least one hygroscopic plasticizer, and the at least one surfactant. During operation of the printer 10, the donor roller 404 rotates in response to the movement of the image receiving surface 14 in the process direction. The donor roller 404 draws the liquid sacrificial coating composition from the reservoir 408 and deposits a layer (not visible) of the composition on the image receiving surface 14. The sacrificial coating composition may be deposited as a uniform layer having any desired thickness. Examples include thicknesses ranging from about 0.1 μm to about 10 μm. The SMU 92 deposits the sacrificial coating composition on the image receiving surface 14. After a drying process, the dried sacrificial coating substantially covers the image receiving surface 14 before the printer ejects ink drops during a print process. In some embodiments, the donor roller 404 is an anilox roller or an elastomeric roller made of a material, such as rubber.

Figure 2B:
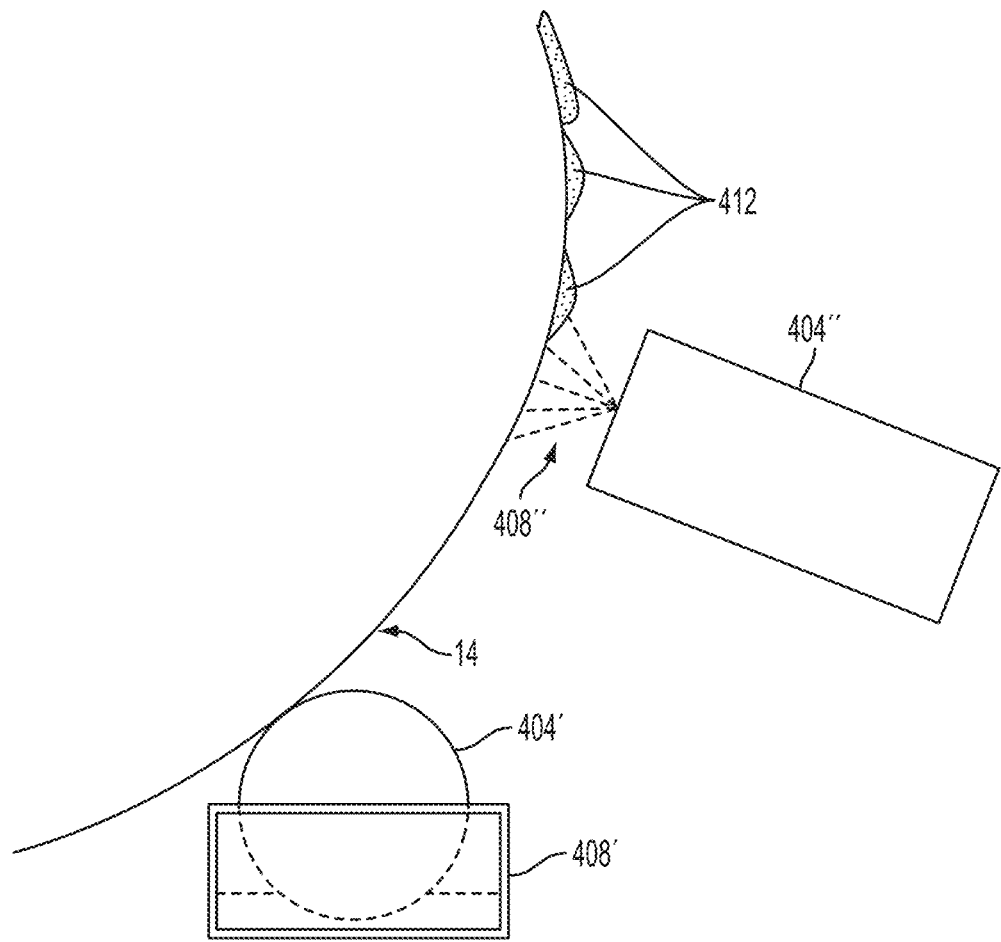
FIG. 2B is a schematic drawing of a surface maintenance unit that includes an applicator for applying at least some components to form a first portion of a sacrificial coating composition onto a surface of an intermediate transfer member in an inkjet printer and a catalyst-delivery printhead for ejecting droplets of catalyst onto the first portion of the sacrificial coating

In an embodiment depicted in FIG. 2B, the SMU 92 includes a more than one of a sacrificial coating applicator, such as a donor roller 404' and at least one printhead 404". Donor roller 404' is partially submerged in a reservoir 408' that holds one or more components of the sacrificial coating composition. For example the reservoir 408' holds a first portion of the liquid sacrificial coating composition described above. The first portion of the liquid sacrificial may include the at least one polymer, the at least one hygroscopic plasticizer, and the at least one surfactant. The donor roller 404' rotates in response to the movement of the image receiving surface 14 in the process direction. The donor roller 404' draws the first portion of the liquid sacrificial coating composition from the reservoir 408" and deposits (not visible) a layer of the first portion of the sacrificial coating composition on the image receiving surface 14. The sacrificial coating composition may be deposited as a uniform layer having any desired thickness. Examples include thicknesses ranging from about 0.1 μm to about 10 μm. In some illustrative embodiments, the donor roller 404' is an anilox roller or an elastomeric roller made of a material, such as rubber.

The at least one printhead 404" includes a sacrificial coating composition supply and delivery subsystem 91 (shown in FIG. 1) that has at least one source 93 (also shown in FIG. 1) to provide a second portion of the sacrificial coating composition. The second portion of the sacrificial coating composition may include the at least one crosslinker, which may be a chain extender. Printhead 404" extends across the width of the blanket and ejects droplets 408" of the second portion of the sacrificial coating composition onto the first portion of the sacrificial coating composition deposited by roller 404' in, for example, an imagewise pattern. The at least one printhead 404" can be included in a printhead module that includes a single printhead or a plurality of printheads, for example, a plurality of printheads configured in a staggered arrangement for delivery of the droplets of the second portion of sacrificial coating composition. The printhead module can be operatively connected to a frame (not shown) and aligned to eject the droplets of the second portion of the sacrificial coating composition in an imagewise pattern 412 on the first portion of the sacrificial coating composition deposited by roller 404'. The associated printhead module for the at least one printhead 404" can include corresponding electronics, reservoirs, and conduits to supply the second portion of the sacrificial coating composition to the one or more printheads. For example, conduits (not shown) can operatively connect a source 93 (shown in FIG. 1) to the at least one printhead 404" to provide a supply of sacrificial coating composition, for example, the second portion of the sacrificial coating composition, to the at least one printhead 404". The at least one printhead 404" can be the same kind of printhead used for depositing ink, such as printheads associated with printhead modules 34A-34D described below. The printhead for jetting the sacrificial coating composition can be a conventional printhead such as Kyocera KJ4B series which is designed for jetting water based inks. In some embodiments, SMU does not include roller 404' and the first and second portions of the sacrificial coating composition are each deposited by respective ones of the at least one printhead 404". In some embodiments, a combination of roller 404' and more than one printhead 404" may each be utilized to deposit different or same components of the sacrificial coating composition.

At least the second portion of the sacrificial coating composition, for example, the crosslinker, which may be a chain extender, can be deposited dropwise, via jetting from a nozzle associated with printhead 404", and in an imagewise pattern. The second portion of sacrificial coating composition deposited in this manner can have any desired thickness. Examples include thicknesses ranging from about 0.1 μm to about 10 μm.

Returning to FIG. 1, the SMU 92 deposits the sacrificial coating composition on the image receiving surface 14. After a drying process, for example, at least a partial-drying process, the dried (or partially dried) sacrificial coating composition is formed into sacrificial coating that covers the whole image receiving surface, or only the portion of the image receiving surface 14 defining an image, for example, where the at least one printheads of printhead modules 34A-34D subsequently eject ink drops in an imagewise pattern during a print process. Alternatively, after a drying process, for example, at least a partial-drying process, the dried (or partially dried) sacrificial coating composition, such as the first portion of the sacrificial coating composition, is formed into sacrificial coating that covers the whole image receiving surface, with the second portion of the sacrificial coating composition covering a portion of the image receiving surface 14 defining an image, for example, where the at least one printheads of printhead modules 34A-34D subsequently eject ink drops in an imagewise pattern during a print process.

The SMU 92 can be operatively connected to a controller 80, described in more detail below, to enable the controller to operate the donor roller, printhead, and a metering blade and a cleaning blade (not visible), selectively to deposit and distribute the sacrificial coating composition onto the surface of the blanket and to remove un-transferred ink and any sacrificial coating residue from the surface of the blanket 21.

Referring back to FIG. 1, to perform the drying or partial drying, and/or curing or partial curing of the sacrificial coating composition deposited by SMU, the printer 10 includes a dryer 96 that emits heat and optionally directs an air flow toward the sacrificial coating composition that is applied to the image receiving surface 14. The dryer 96 facilitates the evaporation of at least a portion of the liquid carrier from the sacrificial coating composition to leave a dried layer on the image receiving surface 14 before the intermediate transfer member passes the printhead modules 34A-34D to receive the aqueous printed image. For example, dryer 96 may partially dry the sacrificial coating composition, such as the first portion and/or section portion of the sacrificial coating composition, to form a sacrificial coating. Optionally, depending on temperature and time that sacrificial coating composition is exposed to the dryer, the dryer may serve to activate the crosslinker, such as a chain extender, of the liquid sacrificial coating, for example, the crosslinker of the second portion of the sacrificial coating composition ejected by the printhead in an imagewise pattern, to at least partially cure the sacrificial coating composition.

The printer 10 can include an optical sensor 94A, also known as an image-on-drum ("IOD") sensor, which is configured to detect light reflected from the blanket surface 14 and the sacrificial coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the sacrificial coating. The optical sensor 94A generates a series of rows of image data, which are referred to as "scan lines," as the intermediate transfer member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A can be analyzed by the controller 80 or other processor in the printer 10 to identify the thickness of the sacrificial coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink, for example, an ink composition comprising the latex emulsion, reactive elastomeric latex, at least one colorant and at least one solvent comprising water as discussed above. Since the illustrated printer 10 is a multicolor image producing machine, the ink delivery system 20 includes, for example, four (4) sources 22, 24, 26, 28, representing four (4) different colors CYMK (cyan, yellow, magenta, black) of aqueous inks. In the embodiment of FIG. 1, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

Accordingly, during operation of printer 10, in which the printer performs an indirect printing process, the printheads of modules 34A-34D may eject droplets of an ink composition in the imagewise pattern onto the dried or partially dried, cured or partially cured sacrificial coating. Thus, the reactive elastomeric latex of the ink deposited in the imagewise pattern may react with the crosslinker, such as the chain extender, deposited with all other components of the sacrificial composition to cover the whole blanket (such as the SMU shown in FIG. 2A), or the crosslinker (or chain extender) deposited in an imagewise pattern as ejected droplets from printhead 404" of SMU 92 (as shown in FIG. 2B).

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or solvent in the ink. The heated air source 136 directs heated air over the ink to supplement the evaporation of the water or solvent from the ink. In one embodiment, the dryer 136 is a heated air source with the same design as the dryer 96. While the dryer 96 is positioned along the process direction to dry the hydrophilic composition, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a print medium supply and handling system 40 that stores, for example, one or more stacks of paper print mediums of various sizes. The print medium supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut print mediums 49, for example. The print medium supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 1, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of the controller 80, such as an electronic subsystem (ESS). The ESS or controller 80 is operably connected to the intermediate transfer member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 1 is described as having a blanket 21 mounted about an intermediate rotating member 12, other configurations of an image receiving surface can be used. For example, the intermediate rotating member can have a surface integrated into its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and sacrificial coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the print medium 49 in the process direction P to a position adjacent the transfix roller 19 and then through the transfix nip 18 between the transfix roller 19 and the blanket 21. The transfix roller 19 applies pressure against the back side of the print medium 49 in order to press the front side of the print medium 49 against the blanket 21 and the intermediate transfer member 12. Although the transfix roller 19 can also be heated, in the exemplary embodiment of FIG. 1, the transfix roller 19 is unheated. Instead, the pre-heater assembly 52 for the print medium 49 is provided in the media path leading to the nip. The pre-conditioner assembly 52 conditions the print medium 49 to a predetermined temperature that aids in the transferring of the image to the media, thus simplifying the design of the transfix roller. The pressure produced by the transfix roller 19 on the back side of the heated print medium 49 facilitates the transfixing (transfer and fusing) of the image from the intermediate transfer member 12 onto the print medium 49. The rotation or rolling of both the intermediate transfer member 12 and transfix roller 19 not only transfixes the images onto the print medium 49, but also assists in transporting the print medium 49 through the nip. The intermediate transfer member 12 continues to rotate to enable the printing process to be repeated.

After the intermediate transfer member moves through the transfix nip 18, the image receiving surface passes a cleaning unit that removes residual portions of the sacrificial coating and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 1, another embodiment has a cleaning unit that includes a roller or other member that applies a mixture of water and detergent to remove residual materials from the image receiving surface 14 after the intermediate transfer member moves through the transfix nip 18. As used herein, the term "detergent" or cleaning agent refers to any surfactant, solvent, or other chemical compound that is suitable for removing any sacrificial coating and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface. In an embodiment, no residue of the sacrificial coating layer remains on the ITM after transferring the ink and sacrificial layer, in which case cleaning of the ITM to remove residual sacrificial coating may not be an issue.

Figure 3A:
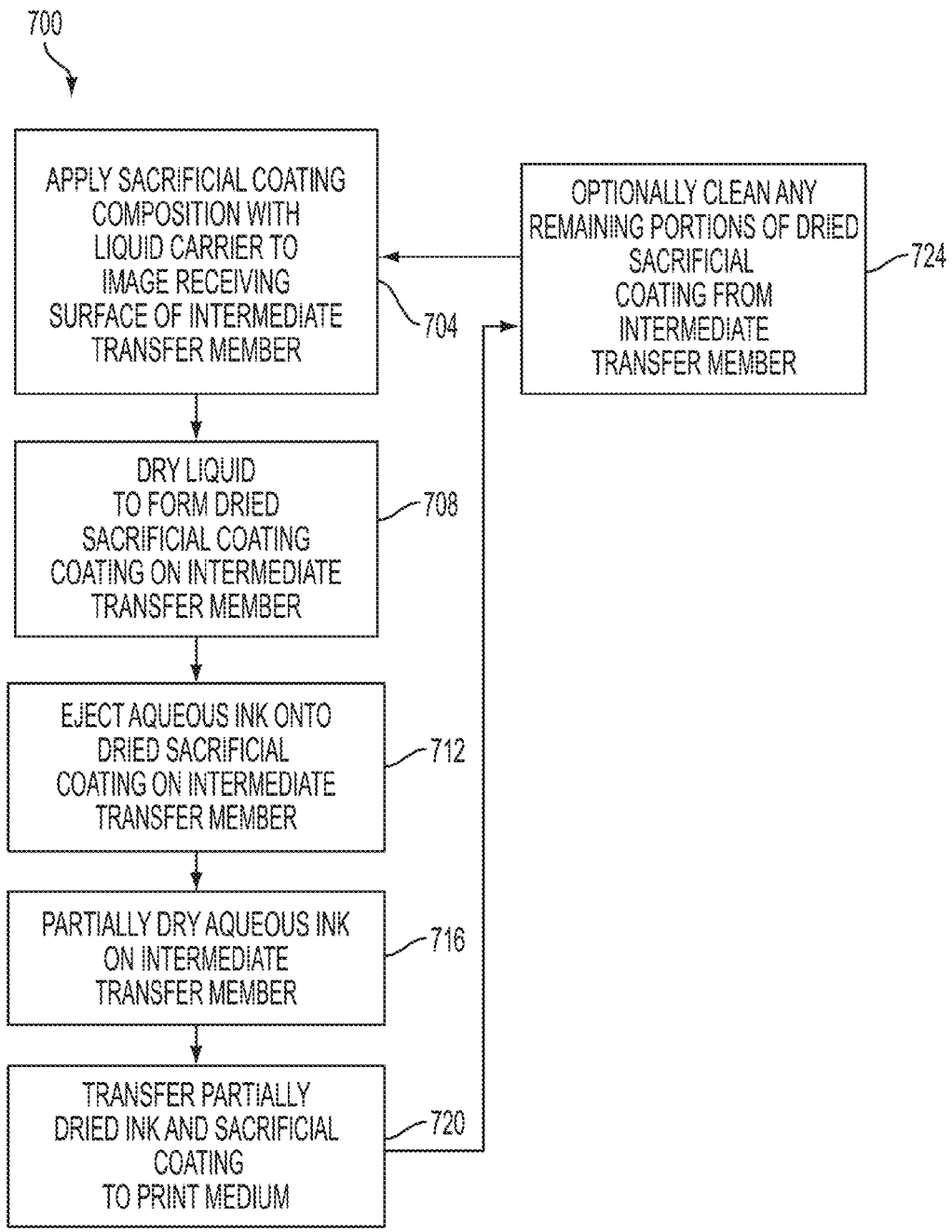
FIG. 3A is a block diagram of a process for printed images in an indirect inkjet printer that uses aqueous inks, according to an embodiment of the present disclosure.

FIG. 3A depicts an indirect printing process 700 for operating an indirect inkjet printer, such as the inkjet printer 10 of FIG. 1. The process 700 is described in conjunction with FIG. 1 showing the printer 10, and FIG. 4A-FIG. 4E showing the blanket and coatings, for illustrative purposes. In the discussion below, a reference to the process 700 performing an action or function refers to a controller, such as the controller 80 in the printer 10, executing stored programmed instructions to perform the action or function in conjunction with other components of the printer. The process 700 may be utilized in using a sacrificial coating composition, such as that described above, to form a coating, such as a dry/partially dry and/or cured/partially cured sacrificial coating on an image receiving surface of an intermediate transfer member prior to ejecting liquid ink drops onto the dried layer. The sacrificial coatings and processes of employing these coatings are not limited to use with printer 10, but can potentially be employed with any inkjet printer comprising an intermediate transfer member, as would be readily understood by one of ordinary skill in the art. Additionally, the sacrificial coating composition may have a pH in the range of about 5 pH to about 10 pH. It is noted that a viscosity of the partially dried sacrificial composition may be at least 10 to 100 times greater than a viscosity of the ink composition deposited thereon.

Figure 3B:
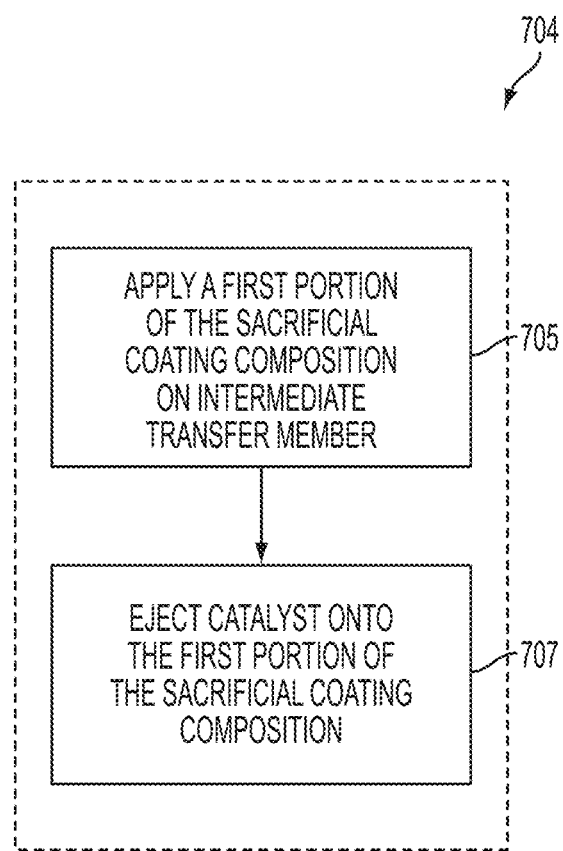
FIG. 3B is a block diagram of a process for printed images in an indirect inkjet printer that uses aqueous inks, according to an embodiment of the present disclosure.

Process 700 begins as the printer forms a liquid sacrificial coating composition layer by applying a layer of a sacrificial coating composition with, for example, a liquid carrier, to the image receiving surface of the intermediate transfer member (block 704 in FIG. 3A). Alternatively, process 700 may begin at block 704', of FIG. 3B, which may be substituted in for block 704 of FIG. 3A, as the printer forms a liquid sacrificial coating composition layer by applying (at block 705) a first portion of the sacrificial coating composition on the intermediate transfer member and then ejecting a second portion of the sacrificial coating composition, such as a catalyst or crosslinker, onto the first portion of the sacrificial coating composition (at block 707). With respect to the sacrificial coating compositions of blocks 704 and 704', the liquid carrier may be water or another liquid, such as alcohol, which may be completely or partially evaporated from the image receiving surface in order to form a dry or partially dry sacrificial coating layer, respectively, on the image receiving surface, such as the blanket.

With respect to forming a liquid sacrificial coating composition layer, one or more components of a sacrificial coating composition can be applied onto an intermediate transfer member of a printing apparatus, such as the printer 10 of FIG. 1. For example, the one or more components of the sacrificial coating composition applied to form the sacrificial coating composition layer may include the at least one polymer, the at least one of (i) the at least one crosslinker, such as a chain extender, or (ii) the reactive elastomeric latex, the at least one hygroscopic plasticizer, and the at least one surfactant as described above. Thus block 704 may be performed using the SMU of FIG. 2A in which all the components of the sacrificial coating composition are deposited onto the surface of the intermediate transfer member by roller 404. Alternatively, block 704' may be performed using the SMU of FIG. 2B in which the first portion of the sacrificial coating composition, which may include the at least one hygroscopic plasticizer, the at least one surfactant and the at least one polymer, is applied at block 705 by the roller 404'. Additionally, the second portion of the sacrificial coating composition may include the at least one crosslinker and may be ejected as droplets at block 707 onto the first portion of the sacrificial coating composition applied at block 705, and in an imagewise pattern through the nozzles of printhead 404".

Figure 4A:
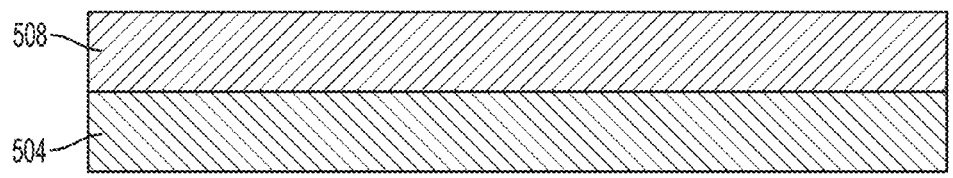
FIG. 4A is a side view of a sacrificial coating composition that is formed on the surface of an intermediate transfer member in an inkjet printer, according to an embodiment of the present disclosure.

Referring to the printer 10 illustrated in FIG. 1, the drum 12 and blanket 21 move in the process direction along the indicated circular direction 16 during the process 700 to receive the sacrificial coating composition. In FIG. 4A, the surface of the intermediate transfer member 504 is covered with the sacrificial coating composition to form sacrificial coating composition layer 508. The SMU depicted in FIG. 2A may deposit the sacrificial coating composition layer 508 on the intermediate transfer member 504 which may be, for example, the image receiving surface 14 of the blanket 21, to form a uniform sacrificial coating. A greater coating thickness of the sacrificial coating composition enables formation of a uniform layer that completely covers the image receiving surface, but the increased volume of liquid carrier in the thicker coating requires additional drying time or larger dryers to remove the liquid carrier to form a dried layer. Thinner coatings of the sacrificial coating composition require the removal of a smaller volume of the liquid carrier to form the dried layer, but if the sacrificial coating is too thin, then the coating may not fully cover the image receiving surface. In certain embodiments the sacrificial coating composition with the liquid carrier is applied at a thickness of between approximately 1 µm and 10 µm. Alternatively, the SMU depicted in FIG. 2B may deposit the sacrificial coating composition layer 508 in two steps, with the first step being that some of the components of the sacrificial coating composition may be deposited onto transfer member 504 as a first portion of layer 508 and others of the components of the sacrificial composition, for example a crosslinker, may be deposited as a second portion of layer 508 (not shown) on the first portion. The second portion may, therefore, be deposited in an imagewise pattern only at locations where a subsequently deposited ink composition, such as an ink composition that comprises a reactive elastomeric latex capable of reacting with the crosslinker, is deposited thereon.

Figure 4B:
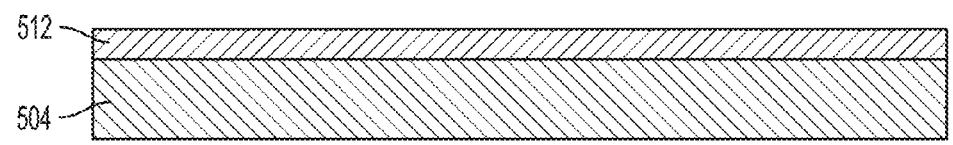
FIG. 4B is a side view of dried hydrophilic composition on the surface of the intermediate transfer member after a dryer removes a portion of a liquid carrier in the hydrophilic composition, according to an embodiment of the present disclosure.

Process 700 continues as a dryer in the printer, such as dryer 96 of FIG. 1, dries or partially dries the sacrificial coating composition to remove at least a portion of the liquid carrier and to form a dried layer on the image receiving surface (block 708). In the printer 10 the dryer 96 applies radiant heat and optionally includes a fan to circulate air onto the image receiving surface of the drum 12 or belt 13. FIG. 4B depicts the dried layer 512. The dryer 96 removes a portion of the liquid carrier, which decreases the thickness of the dried layer that is formed on the image receiving surface. In the printer 10 the thickness of the dried layer 512 can be any suitable desired thickness. Example thicknesses range from about 0.1 µm to about 3 µm in different embodiments, and in certain specific embodiments from about 0.1 to about 0.5 µm. Optionally, dryer 96 may energize the crosslinker of the sacrificial coating composition to cure or partially cure the sacrificial coating layer.

The dried or partially dried, and/or cured or partially cured, sacrificial coating 512 is also referred to as a "skin" layer. The dried sacrificial coating 512 may have a uniform thickness that covers substantially all of the portion of the image receiving surface. In the case where the sacrificial coating composition layer is deposited in a first step and a second step, the portion of the sacrificial coating composition layer deposited in the first step may cover substantially all of the portion of the image receiving surface and the portion of the sacrificial coating composition layer that, for example, may include the crosslinker may cover only the surface of the image receiving surface that receives aqueous ink during a printing process, for example, only those surfaces covered by the imagewise pattern. As described above, while the sacrificial coating with the liquid carrier includes solutions, suspension, or dispersion of the sacrificial coating material in a liquid carrier, the dried sacrificial coating 512 covers the image receiving surface of intermediate transfer member 504. The dried sacrificial coating 512 has a comparatively high level of adhesion to the image receiving surface of intermediate transfer member 504, and a comparatively low level of adhesion to a print medium that contacts the dried layer 512. As described in more detail below, when aqueous ink drops are ejected onto portions of the dried coating 512, such as in an imagewise pattern, a portion of the water and other solvents in the aqueous ink permeates the dried coating 512 and the reactive elastomeric latex of the ink reacts with the crosslinker of the dried sacrificial coating 512.

Process 700 continues as the image receiving surface with the dry or partially dry and/or cured or partially cured sacrificial coating moves past one or more printheads that eject aqueous ink drops onto the sacrificial coating formed on the intermediate transfer member to form a latent aqueous printed image (block 712). For example, the printhead modules 34A-34D in the printer 10 eject ink drops in the CMYK colors, for example, in an imagewise pattern to form an ink pattern such as the printed image. The inks can include an ink composition described above. For example, the inks can include a latex emulsion and a reactive elastomer latex capable of reacting with the crosslinker (of the sacrificial coating composition). Thus, in an embodiment, the reactive elastomeric latex may include about 0.01 wt % to about 10 wt % of the aqueous ink composition.

The sacrificial coating 512 may be substantially impermeable to the colorants in the ink 524, and the colorants may, therefore, remain on the surface of the dried sacrificial coating 512 where the aqueous ink spreads. The spread of the liquid ink enables neighboring aqueous ink drops to merge together on the image receiving surface instead of beading into individual droplets as occurs in traditional low-surface energy image receiving surfaces.

Referring again to FIG. 3, the process 700 continues with a drying process of the aqueous ink deposited on the dry or partially dry and/or cured or partially cured sacrificial coating formed on the intermediate transfer member (block 716). The drying process removes a portion, such as a substantial portion, of the water from the aqueous ink and the sacrificial coating, also referred to as the skin layer, on the intermediate transfer member so that the amount of water that is transferred to a print medium in the printer does not produce cockling or other deformations of the print medium. Alternatively or in addition, the drying process may be utilized to activate the crosslinker, such as the chain extender, in the dry or partially dry and/or cured or partially cured sacrificial coating to crosslink with the reactive elastomeric latex of the ink.

In the printer 10, the heated air source 136 directs heated air toward the image receiving surface 14 to dry the printed aqueous ink image and/or activate the crosslinker to crosslink with the reactive elastomer of the ink. In some embodiments, the intermediate transfer member and blanket are heated to an elevated temperature to promote evaporation of liquid from the ink and/or from the sacrificial coating composition layer. For example, in the printer 10, the imaging drum 12 and blanket 21 are heated to a temperature of 50° C. to 70° C. to enable partial drying of the ink in the dried layer during the printing process. As depicted in FIG. 4D, the drying process forms a partially dried aqueous ink 532 that retains a reduced amount of water compared to the freshly printed aqueous ink image of FIG. 4C and the reactive elastomer of which may be crosslinked to the crosslinker of the sacrificial coating 512.

The drying process also increases the viscosity of the aqueous ink, which changes the consistency of the aqueous ink from a low-viscosity liquid to a higher viscosity tacky material. The drying process also reduces the thickness of the ink 532. In an embodiment, the drying process removes sufficient water so that the ink contains less that 5% water or other solvent by weight, such as less than 2% water, or even less than 1% water or other solvent, by weight of the ink.

Process 700 continues as the printer transfixes the latent aqueous ink image from the image receiving surface to a print medium, such as a sheet of paper (block 720). In the printer 10, the image receiving surface 14 of the drum 12 engages the transfix roller 19 to form a nip 18. A print medium, such as a sheet of paper, moves through the nip between the drum 12 and the transfix roller 19. The pressure in the nip transfers the latent aqueous ink image and a portion of the dried layer to the print medium. After passing through the transfix nip 18, the print medium carries the printed aqueous ink image. As depicted in FIG. 4E, a print medium 536 carries a printed aqueous ink image 532 with the sacrificial coating 512 covering the ink image 532 on the surface of the print medium 536. The sacrificial coating 512 provides protection to the aqueous ink image from scratches or other physical damage while the aqueous ink image 532 dries on the print medium 536. The sacrificial coating 512 may be formed such that it covers the ink image 532 and may not extend substantially further than the perimeter of the image 532. In other words, both the ink image and sacrificial coating may each be formed according to an imagewise pattern.

During process 700, the printer cleans any residual portions of the sacrificial coating 512 that may remain on the image receiving surface after the transfixing operation (block 724). In one embodiment, a fluid cleaning system 395 uses, for example, a combination of water and a detergent with mechanical agitation on the image receiving surface to remove the residual portions of the sacrificial coating 512 from the surface of the belt 13. In the printer 10, a cleaning blade 95, which can be used in conjunction with water, engages the blanket 21 to remove any residual sacrificial coating 512 from the image receiving surface 14. The cleaning blade 95 is, for example, a polymer blade that wipes residual portions of the sacrificial coating 512 from the blanket 21.

During a printing operation, process 700 returns to the processing described above with reference to block 704 or 704' to apply the sacrificial coating composition to the image receiving surface, print additional aqueous ink images, and transfix the aqueous ink images to print media for additional printed pages in the print process. The illustrative embodiment of the printer 10 operates in a "single pass" mode that forms the dried layer, prints the aqueous ink image and transfixes the aqueous ink image to a print medium in a single rotation or circuit of the intermediate transfer member. In alternative embodiments, an inkjet employs a multi-pass configuration where the image receiving surface completes two or more rotations or circuits to form the dried layer and receive the aqueous ink image prior to transfixing the printed image to the print medium.

Figure 4C:
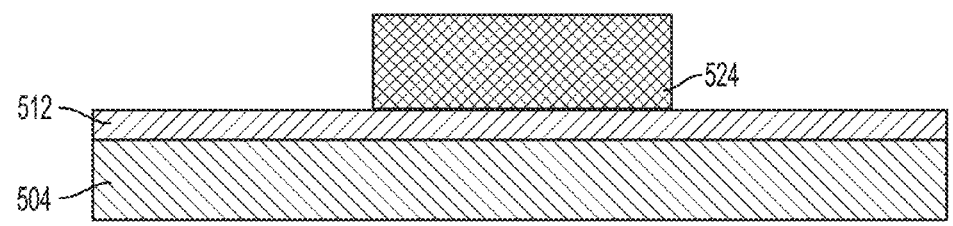
FIG. 4C is a side view of a portion of an aqueous ink image that is formed on the dried hydrophilic composition on the surface of the intermediate transfer member, according to an embodiment of the present disclosure.
Figure 4D:
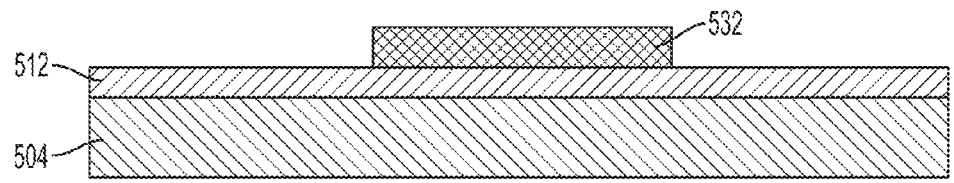
FIG. 4D is a side view of a portion of the aqueous ink image that is formed on the dried hydrophilic composition after a dryer in the printer removes a portion of the water in the aqueous ink, according to an embodiment of the present disclosure.
Figure 4E:
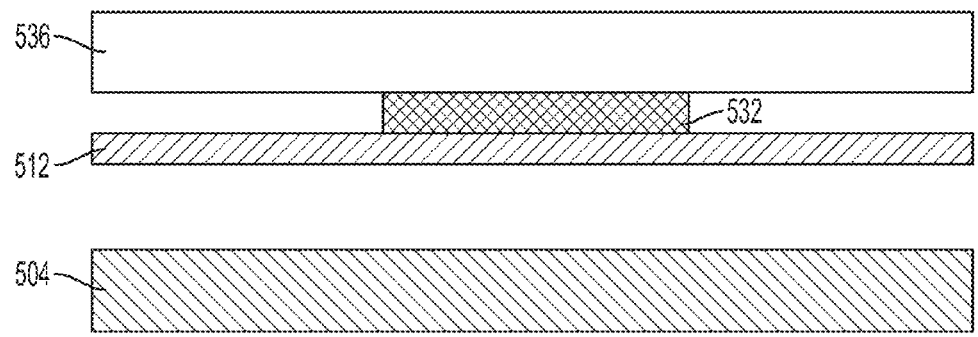
FIG. 4E is a side view of a print medium that receives the aqueous ink image and a portion of the dried layer of the hydrophilic composition after a transfix operation in the inkjet printer, according to an embodiment of the present disclosure.

In some embodiments of the process 700, the printer forms printed images using a single layer of ink such as the ink that is depicted in FIG. 4C. In the printer 10, however, the multiple printhead modules enable the printer to form printed images with multiple colors of ink formed in single or stacked layers. In other embodiments of the process 700, the printer forms images using multiple ink colors. In some regions of the printed image, multiple colors of ink may overlap in the same area on the image receiving surface, forming multiple ink layers on the hydrophilic composition layer. The method steps in FIG. 3 can be applied to the multiple ink layer circumstance with similar results.

EXAMPLES

Example 1

Preparation of Emulsion Polymerization Latex

A latex emulsion comprised of polymer particles generated from the emulsion polymerization of styrene, n-butyl acrylate, methacrylic acid, beta-CEA and Dowfax 2A1 surfactant was prepared as follows:

A surfactant solution of 1.7 grams Dowfax 2A1 (anionic alkyldiphenyloxide disulfonate, The Dow Chemical Company) and 236.6 grams de-ionized water was prepared by mixing for 10 minutes in a stainless steel holding tank. The holding tank was then purged with nitrogen for 5 minutes before transferring into the reactor. The reactor was then continuously purged with nitrogen while being stirred at 450 rpm. The reactor was then heated up to 80° C. at a controlled rate, and held there.

Separately, 3.6 grams of ammonium persulfate initiator was dissolved in 37.7 grams of de-ionized water.

Separately, the monomer emulsion was prepared in the following manner. 148.5 g of styrene, 93.5 g of butyl acrylate, 33.0 g methacrylic acid, 8.25 g of beta-CEA, 1.7 g of 1-dodecanethiol, 0.96 g of 1,10-decanediol diacrylate (ADOD) were added to a premix of 9.4 g of Dowfax 2A1 in 126.8 g of deionized water were mixed to form an emulsion. 1% of the above emulsion (4.22 g) was then slowly dropped into the reactor containing the aqueous surfactant phase at 80° C. to form the "seeds" while being purged with nitrogen. The initiator solution was then slowly charged into the reactor.

The monomer emulsion was split into two aliquots, 206.8 g of the monomer emulsion was initially feed into the reactor at 1.67 g/min. The second aliquot of 213.1 g monomer emulsion was mixed with 2.0 g of DDT and added to the reactor at 2.37 g/min. Once all the monomer emulsion was charged into the main reactor, the temperature was held at 80° C. for an additional 2 hours to complete the reaction. Full cooling was then applied and the reactor temperature was reduced to 25° C. The product was collected into a holding tank and sieved with a 25 μm screen.

The particle size was then measured by Nanotrac® U2275E particle size analyzer to have a D50 of 100.3 nm and a D95 of 141.1 nm. The Tg and Ts results are summarized in Table 1

TABLE 1

Latex Tg and Ts (softening point)

| | Comparative Latex | Exemplary Latex |
|---|---|---|
| wt % methacrylic acid (MAA) | 12 | 12 |
| $Tg_{(on)}$ (° C.) | 63 | 53 |
| Ts softening point (° C.) | 149 | 122 |

Example 2

Base Ink Composition

A small batch of base ink comprising the latex of Example 1 was prepared. Table 2 summarizes the ink composition:

TABLE 2

Base Ink Composition

| Component | solution (wt %) | solids (%) | wt % (%) | mass (g) |
|---|---|---|---|---|
| Exemplary Latex (of Example 1) | 6.70 | 39.86 | 16.81 | 16.81 |
| diethylene glycol | 11.55 | 100 | 11.55 | 11.55 |
| 1,5-Pentanediol | 14.15 | 100 | 14.15 | 14.15 |
| Glycerol | 4.58 | 100 | 4.58 | 4.58 |
| 2-ethyl-1-hexanol | 1.00 | 100 | 1.00 | 1.00 |
| PEO | 0.30 | 100 | 0.30 | 0.30 |
| Carbon Black 300 | 3.30 | 14.87 | 22.19 | 22.19 |
| Triethanolamine | 1.00 | 100 | 1.00 | 1.00 |
| anionic fluorosurfactant (e.g., S-761P available from ChemGuard Speciality Chemicals, Mansfield Texas) | 0.01 | 10 | 0.1 | 0.1 |
| Wetting agent (e.g., Surfynol 104H available from Air Products and Chemicals, Inc., Allentown, PA) | 0.1 | 100 | 0.1 | 0.1 |
| Water | 57.31 | 100 | 28.22 | 28.22 |
| TOTAL | 100.00 | | 100 | 100.00 |

Example 3

Reactive Ink Formulation 3 wt % of a reactive latex, for example, a water-based aliphatic polyurethane elastomer such as PRECIDIUM™ Aqua 90A (available from Quantum Chemical, Alberta, Canada) was loaded into the base ink formulation of Example 2.

Example 4

Sacrificial Coating Compositions

Three different sacrificial coating compositions, including two exemplary compositions and a control composition were formulated according to Table 3 below.

TABLE 3

Sacrificial Coatings Compositions

| SAMPLE | Polymer Description | Component Ratio |
|---|---|---|
| Exemplary Sacrificial Coating Composotion #1 (includes both crosslinker and reactive elastomeric latex) | 10% Celvol 203 PVOH-low Mw, low partially hydrolyzed (hydrolysis 87-89%, viscosity 3.5-4.5; pH = 4.5-6.5) | 1.5% Celvol 203 (PVOH); 5% glycerol; 1% TERGITOL ™ (TMN-6; available from Dow Chemical Company); 3% AQUA 90A (reactive elastomeric latex); 1% crosslinker; 88.5% DI Water |
| Exemplary Sacrificial Coating Composotion #2 (includes crosslinker but no reactive elastomeric latex) | 10% Celvol 203 PVOH-low Mw, low partially hydrolyzed (hydrolysis 87-89%, viscosity 3.5-4.5; pH = 4.5-6.5) | 1.5% Celvol 203 (PVOH); 5% glycerol; 1% TERGITOL ™ (TMN-6; available from Dow Chemical Company); 1% crosslinker; 91.5% DI Water |
| Control Sacrificial Coating Composotion (no crosslinker or reactive elastomeric latex) | 10% Celvol 203 PVOH-low Mw, low partially hydrolyzed (hydrolysis 87-89%, viscosity 3.5-4.5; pH = 4.5-6.5) | 1.5% Celvol 203 (PVOH); 5% glycerol; 1% TERGITOL ™ (TMN-6; available from Dow Chemical Company); 1% crosslinker; 92.5% DI Water |

Example 5

Coating Process

Comparative sacrificial coating composition #1, sacrificial coating composition #2, and control sacrificial coating composition of Example 4 were each individually coated on corresponding blanket substrates using a Pamarco anilox roll 165Q13 by hand to form sacrificial coating #1, sacrificial coating #2, and control sacrificial coating, respectively.

The blanket substrates were made from fluorinated polymer G621 manufactured by Daikin Industries, Ltd. and a crosslinker, AO700. (aminoethyl aminopropyl trimethoxysilane from Gelest).

A hotplate was set to 60° C. while the substrate temperature was around 50° C. The wet film thicknesses of each of the coatings were around 4-5 microns and the dry film thickness was around 500 nm to 1.5 microns. The coated films were dried in oven at 60° C. for 30 seconds.

Example 6

Optical Microscope Images

Figure 5A:
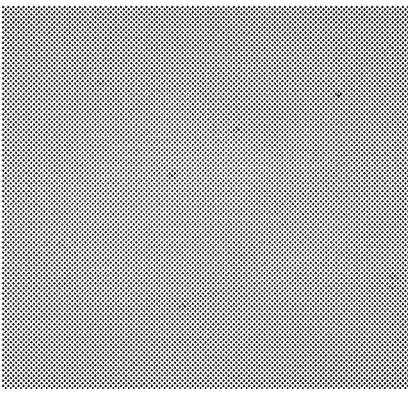
FIGS. 5A-5C are microscope images showing film-forming property of various coating compositions as deposited on a blanket substrates and then dried as described in the examples below.
Figure 5B:
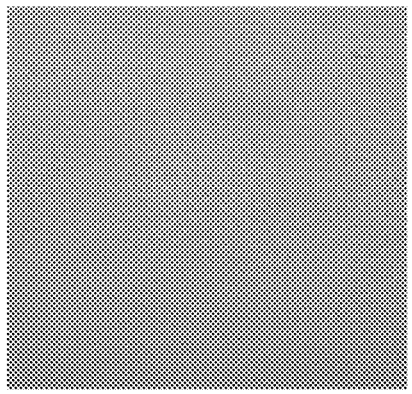
Figure 5C:
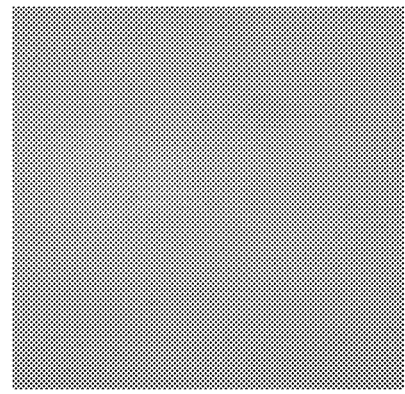

FIGS. 5A-5C show optical microscope images taken of each of the coatings prepared in Example 5 on G621 blanket substrate before a transfer test was conducted. Very uniform films were achieved for each of the three compositions of Example 4.

Example 7

Transfer Test

Collins ink, Base Ink (of example 2) and reactive ink (of Example 3) were deposited on the exemplary sacrificial coatings and control coating of Example 5, and tested at 110° C. to identify optimum condition for transfer.

The results were graded as "fair," "pass," "pass+," "pass++," or "pass+++," based on visual inspection as shown in Table 4 below.

TABLE 4

Transfer properties of Ink Compositions on Sacrificial Coatings.

| SAMPLE | Collins Ink | Base Ink | Reactive Ink |
|---|---|---|---|
| Exemplary Sacrificial Coating #1 (formed of composition that included both crosslinker and reactive elastomeric latex) | fail | pass | Not Tested |
| Exemplary Sacrificial Coating #2 (formed of composition that included crosslinker but no reactive elastomeric latex) | Not Tested | pass++ | pass+++ |
| Control Sacrificial Coating (formed of composition that included no crosslinker or reactive elastomeric latex) | Not Tested | pass+ | Not Tested |

The results show that a combination of reactive ink composition that contains a reactive elastomer and a sacrificial coating formed from a sacrificial coating composition that contained a crosslinker that reacts with the reactive elastomer results in a "pass+++" grade because visual inspection revealed significant improvement in transfer efficiency. The transferred image was also found to have excellent robustness properties.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An indirect printing process, comprising:
    forming a liquid sacrificial coating composition layer by applying one or more components of a sacrificial coating composition onto an intermediate transfer member of a printing apparatus, wherein the one or more components are selected from the group consisting of:
        at least one polymer,
        at least one chain extender, wherein the at least one chain extender comprises a species capable of linking linear chains or chain segments of the reactive elastomeric latex;
        at least one hygroscopic plasticizer; and
        at least one surfactant;
    forming a sacrificial coating by at least partially drying the liquid sacrificial coating composition;
    forming a partially cured sacrificial coating by activating the chain extender of the liquid sacrificial coating composition to at least partially cure the sacrificial coating;
    ejecting droplets of an ink composition in an imagewise pattern onto the partially dried sacrificial coating or partially cured sacrificial coating, wherein the ink composition comprises:
        a latex emulsion; and
        a reactive elastomeric latex capable of reacting with the chain extender;
    processing the ink to form an ink pattern on the intermediate transfer member, wherein processing comprises activating the chain extender to react with the reactive elastomeric latex and substantially drying the ink composition; and
    transferring both the ink pattern and the sacrificial coating from the intermediate transfer member to a final substrate.

2. The process of claim 1, wherein the applying one or more components of the sacrificial coating composition comprises:
    applying a first portion of the liquid sacrificial coating composition comprising the at least one hygroscopic plasticizer, the at least one surfactant, and the at least one polymer onto the intermediate transfer member; and ejecting droplets of a second portion of the liquid sacrificial coating composition, the second portion comprising the at least one chain extender through nozzles of a printhead onto the first portion of the liquid sacrificial coating composition layer.

3. The process of claim 2, wherein the droplets of the second portion of the liquid sacrificial coating composition comprising the at least one chain extender are ejected in the imagewise pattern.

4. The process of claim 1, wherein the chain extender comprises between about 0.1 wt % and about 10 wt % of the liquid sacrificial coating composition.

5. The process of claim 1, wherein the reactive elastomeric latex comprises about 0.01 wt % to about 10 wt % of the aqueous ink composition.

6. The process of claim 1, wherein a viscosity of the partially dried sacrificial composition is at least 10 times greater than a viscosity of the ink composition.

* * * * *